United States Patent
Zhou et al.

(10) Patent No.: US 7,887,689 B2
(45) Date of Patent: Feb. 15, 2011

(54) METHOD AND APPARATUS FOR ATTACHING NANOSTRUCTURE-CONTAINING MATERIAL ONTO A SHARP TIP OF AN OBJECT AND RELATED ARTICLES

(75) Inventors: Otto Z. Zhou, Chapel Hill, NC (US); Bo Gao, Carrboro, NC (US); Guozhen Yue, Carrboro, NC (US); Soojin Oh, Carrboro, NC (US)

(73) Assignees: The University of North Carolina at Chapel Hill, Chapel Hill, NC (US); Xintek, Inc., Research Triangle Park, NC (US)

( * ) Notice: Subject to any disclaimer, the term of this patent is extended or adjusted under 35 U.S.C. 154(b) by 1084 days.

(21) Appl. No.: 10/842,357

(22) Filed: May 10, 2004

(65) Prior Publication Data
US 2005/0133372 A1 Jun. 23, 2005

Related U.S. Application Data (62) Division of application No. 09/996,695, filed on Nov. 30, 2001, now Pat. No. 7,252,749.

(51) Int. Cl.
C25D 13/02 (2006.01)
(52) U.S. Cl. .................. 204/491; 204/483
(58) Field of Classification Search ............ 204/490, 204/491, 483
See application file for complete search history.

(56) References Cited

U.S. PATENT DOCUMENTS

| | | | |
|---|---|---|---|
| 3,037,923 A | | 6/1962 | Gnau |
| 3,794,593 A | * | 2/1974 | Coenen et al. ............ 204/490 |
| 4,500,397 A | * | 2/1985 | Mori ....................... 204/487 |
| 5,296,117 A | | 3/1994 | De Jaeger et al. |
| 5,906,721 A | | 5/1999 | Bojkov et al. |
| 6,057,637 A | | 5/2000 | Zettl et al. |
| 6,258,237 B1 | | 7/2001 | Gal-Or et al. |
| 6,264,816 B1 | * | 7/2001 | Borra ..................... 204/623 |

(Continued)

FOREIGN PATENT DOCUMENTS

CN 1273215 11/2000

(Continued)

OTHER PUBLICATIONS

B. Gao et al., "Fabrication and Electron Field Emission Properties of Carbon Nanotube Films by Electrophoretic Deposition", *Advanced Materials*, vol. 13, Issue 23, pp. 1770-1773, published on-line Nov. 23, 2001.

(Continued)

*Primary Examiner*—Kishor Mayekar
(74) *Attorney, Agent, or Firm*—Jenkins, Wilson, Taylor & Hunt, P.C.

(57) ABSTRACT

A method for attaching nanostructure-containing material onto a sharp tip of an object includes forming a suspension of pre-formed nanostructure-containing material in a liquid medium. An electrode is immersed in the suspension. The sharp tip of the object is arranged to be in contact with the suspension. A voltage is applied to the immersed electrode and to the sharp tip. The nanostructure-containing material attaches to the sharp tip of the object.

13 Claims, 9 Drawing Sheets

U.S. PATENT DOCUMENTS

| | | |
|---|---|---|
| 6,277,318 B1 | 8/2001 | Bower et al. |
| 6,280,697 B1 | 8/2001 | Zhou et al. |
| 6,333,968 B1 | 12/2001 | Whitlock et al. |
| 6,334,939 B1 | 1/2002 | Zhou et al. |
| 6,342,755 B1 | 1/2002 | Russ et al. |
| 6,401,526 B1 | 6/2002 | Dai et al. |
| 6,420,293 B1 | 7/2002 | Chang et al. |
| 6,422,450 B1 | 7/2002 | Zhou et al. |
| 6,456,691 B2 | 9/2002 | Takahashi et al. |
| 6,457,350 B1 | 10/2002 | Mitchell |
| 6,462,467 B1 | 10/2002 | Russ |
| 6,528,785 B1 * | 3/2003 | Nakayama et al. ......... 250/306 |
| 6,553,096 B1 | 4/2003 | Zhou et al. |
| 6,616,497 B1 * | 9/2003 | Choi et al. .................. 445/24 |
| 6,630,772 B1 | 10/2003 | Bower et al. |
| 6,652,967 B2 | 11/2003 | Yadav et al. |
| 6,787,122 B2 | 9/2004 | Zhou |
| 6,824,755 B2 | 11/2004 | Colbert et al. |
| 6,850,595 B2 | 2/2005 | Zhou et al. |
| 6,875,329 B2 | 4/2005 | Washizu et al. |
| 6,876,724 B2 | 4/2005 | Zhou et al. |
| 6,879,143 B2 * | 4/2005 | Nagahara et al. .......... 324/71.1 |
| 6,897,603 B2 | 5/2005 | Mao et al. |
| 6,902,658 B2 | 6/2005 | Talin |
| 6,980,627 B2 | 12/2005 | Qiu et al. |
| 7,014,743 B2 | 3/2006 | Zhou et al. |
| 7,252,749 B2 | 8/2007 | Zhou et al. |
| 7,455,757 B2 | 11/2008 | Oh et al. |
| 2002/0094064 A1 | 7/2002 | Zhou et al. |
| 2002/0140336 A1 | 10/2002 | Stoner et al. |
| 2002/0193040 A1 | 12/2002 | Zhou |
| 2003/0002627 A1 | 1/2003 | Espinosa et al. |
| 2003/0044519 A1 | 3/2003 | Takai et al. |
| 2003/0094035 A1 | 5/2003 | Mitchell |
| 2003/0102222 A1 | 6/2003 | Zhou et al. |
| 2003/0111946 A1 | 6/2003 | Talin et al. |
| 2003/0180472 A1 | 9/2003 | Zhou et al. |
| 2003/0233871 A1 | 12/2003 | Nguyen et al. |
| 2004/0028183 A1 | 2/2004 | Lu et al. |
| 2004/0038251 A1 | 2/2004 | Smalley et al. |
| 2004/0055892 A1 | 3/2004 | Oh et al. |
| 2004/0108298 A1 | 6/2004 | Gao |
| 2004/0240616 A1 | 12/2004 | Qiu et al. |
| 2004/0256975 A1 | 12/2004 | Gao et al. |
| 2005/0133372 A1 | 6/2005 | Zhou et al. |
| 2005/0226361 A1 | 10/2005 | Zhou et al. |
| 2005/0269559 A1 | 12/2005 | Zhou et al. |
| 2005/0281379 A1 | 12/2005 | Qiu et al. |
| 2006/0008047 A1 | 1/2006 | Zhou et al. |
| 2006/0018432 A1 | 1/2006 | Zhou et al. |
| 2006/0244364 A1 | 11/2006 | Nakamoto |
| 2008/0099339 A1 | 5/2008 | Zhou et al. |

FOREIGN PATENT DOCUMENTS

| | | |
|---|---|---|
| EP | 0989579 | 9/1999 |
| EP | 989579 A2 * | 3/2000 |
| GB | 2353138 A | 2/2001 |
| JP | 08170193 | 7/1996 |
| JP | 10237362 | 9/1998 |
| JP | 2000141056 A | 5/2000 |
| JP | 2001-020093 * | 1/2001 |
| JP | 2001110303 | 4/2001 |
| JP | 2001167692 | 6/2001 |
| JP | 2001283716 A | 10/2001 |
| JP | 2001-312955 | 11/2001 |
| JP | 2002-367543 | 12/2002 |
| JP | 2003-100202 | 4/2003 |
| JP | 2002301700 | 10/2005 |
| KR | 2001-75925 | 8/2001 |
| WO | 03/075372 A3 | 9/2003 |

OTHER PUBLICATIONS

A. M. Affoune et al., "Electrophoretic Deposition of Nanosized Diamond Particles", Langmuir, vol. 17, No. 2, 2001, pp. 547-551.

C. Bower et al., "Plasma-induced alignment of carbon nanotubes", Appl. Phys. Lett., vol. 77, No. 6, Aug. 7, 2000, pp. 830-832.

C. Journet et al., "Large-scale production of single-walled carbon nanotubes by the electric-arc technique", Nature, vol. 388, Aug. 21, 1997, pp. 756-760.

Bower et al., U.S. Appl. No. 09/351,537, filed Jul. 1, 1999 entitled "Device Comprising Thin Film Carbon Nanotube Electron Field Emitter Structure".

Chinese Office Action for Chinese Patent Application No. 02827708.2 dated Jan. 12, 2007.

Zhengping et al., "Progress in Bulk-Optic-Material Current Sensors", Lasers and optoelectronics progress 1999, vol. 36, 8, pp. 6-12.

International Search Report for PCT/US04/20150 dated Mar. 10, 2006.

International Preliminary Report for PCT/US2004/020150 dated Apr. 6, 2006.

Korean Intellectual Property Office (KIPO) Office Action for Korean Patent Application No. 10-2006-7000476 dated Jun. 19, 2007.

Chinese Office Action for Chinese Patent Application No. 02827708.2 dated Sep. 7, 2007.

Supplementary European Search Report dated Nov. 2, 2007 for European Patent Application 02807020.9.

Final Office Action from Korean Intellectual Property Office dated Oct. 10, 2008 for Korean Patent Application No. 10-2006-70000476.

Office Action from the Korean Intellectual Property Office for Korean Patent Application No. 10-2006-7000476 dated Feb. 19, 2008.

http://web.archive.org/web/20030507193839/http:snf.sanford.edu/Process/Lithography/liftoff.html, edited Aug. 14, 2000.

Office Action-Restriction/Election Requirement for U.S Appl. No. 11/266,318 dated Apr. 7, 2009.

Fourth Office Action from Chinese Patent Office for Chinese Patent Application No. 02827708.2 (PCT/US02/37184) dated May 8, 2009.

Notice of Grant of Patent Right for Invention for Chinese Patent No. 200380109509.X (PCT/US2003/038743) dated May 8, 2009.

Second non-final Office Action from the Japanese Patent Office dated Feb. 13, 2009 for Japanese Patent Application No. 2003-573718.

First Office Action from Chinese Patent Office dated Dec. 26, 2008 for Chinese Patent Application No. 200480025996.6.

Yang et al., "Magnetic Nanowire Based High Resolution Magnetic Force Microscope Probes", Applied Physics Letter 87 (2005).

Hartmann, U., "Magnetic Force Microscopy", Annu, Rev. Mater. Sci. 1999. 29: p. 53-87.

J.H. Hafner et al., "Structural and Functional Imaging with Carbon Nanotube AFM Probes", Progress in Biophysics & Molecular Biology, 2001. 77: p. 73-110.

T. Larsen et al., "Comparison of Wear Characteristics of Etched-Silicon and Carbon Nanotube Atomic-Force Microscopy Probes", Appl. Phys. Lett., 2002. 80(11): p. 1996-1998.

T. Arie et al., "Carbon-nanotube probe equipped magnetic force microscope",J. Vac. Sci. Technol. B., 2002. 18: p. 104.

H. Cui et al., "Growth of Carbon Nanofibers on Tipless Cantilevers for High Resolution Topography and Magnetic Force Imaging", Nano Letters, 2004. 4(11): p. 2157-2161.

H. Kuramochi et al., "A Magnetic Force Microscope Using CoFe-Coated Carbon Nanotube Probes", Nanotechnology, 2005. 16: p. 24-27.

Z. Deng et al., "Metal-Coated Carbon Nanotube Tips for Magnetic Force Microscopy", Applied Physics Letter, 2004. 85(25): p. 6263.

Jones, T.B., "Electromechanics of Particles", 1995. Cambridge: Cambridge Univ. Press. pp. 34-49.

Jie Tang et al., "Rapid and Reproducible Fabrication of Carbon Nanotube AFM Probes by Dielectrophoresis", Nano Letters, "in press".

R. Stevens et al., "Improved fabrication approach for carbon nanotube probe devices", Appl. Phys. Lett., vol. 77, No. 21, Nov. 20, 2000, pp. 3453-3455.

J. Hafner et al.,"Growth of nanotubes for probe microscopy tips", Nature, vol. 398, Apr. 29, 1999, pp. 761-762.

H. Dai et al.,"Nanotubes as nanoprobes in scanning probe microscopy". Nature, vol. 384, Nov. 14, 1996, pp. 147-150.

Office Action Restriction Requirement dated Aug. 8, 2003 for U.S. Appl. No. 09/996,695.

Office Action-non final action dated Dec. 1, 2003 for U.S. Appl. No. 09/996,695.

Office Action-final action dated May 26, 2004 for U.S. Appl. No. 09/996,695.

Office Action-non final action dated Feb. 17, 2005 for U.S. Appl. No. 09/996,695.

Notice of Allowance dated Apr. 3, 2007 for U.S. Appl. No. 09/996,695.

Office Action Restriction Requirement dated Oct. 11, 2006 for U.S. Appl. No. 10/615,842.

Office Action-non final action dated Feb. 5, 2007 for U.S. Appl. No. 10/615,842.

Office Action-final action dated Sep. 10, 2007 for U.S. Appl. No. 10/615,842.

Office Action-non final action dated Jan. 15, 2008 for U.S. Appl. No. 10/615,842.

Office Action-non final action dated Mar. 28, 2008 for U.S. Appl. No. 10/842,357.

Office Action Restriction Requirement dated Jan. 4, 2005 for U.S. Appl. No. 10/730,068.

Office Action-non final action dated Apr. 21, 2005 for U.S. Appl. No. 10/730,068.

Notice of Allowance dated Oct. 12, 2005 for U.S. Appl. No. 10/730,068.

Office Action from Japanese Patent Office for Japanese Patent Appl. No. 2003-573718 dated Jun. 16, 2008.

Third Office Action dated Aug. 1, 2008 from the Chinese Patent Office for Chinese Patent Application No. 02827708.2 (PCT/US02/37184).

First Office Action dated Aug. 10, 2008 from the Japanese Patent Office for Japanese Patent Application No. 2005-508477 (PCT/US03/38743).

Notice of Allowance dated Sep. 11, 2008 for U.S. Appl. No. 10/615,842.

Second Office Action from Chinese Patent Office for Chinese Patent Application No. 200380109509.X (PCT/US2003/038743) dated Sep. 12, 2008.

First Office Action from Japanese Patent Office for Japanese Patent Application No. 2005-508477 received Sep. 4, 2008.

Third Office Action from Chinese Patent Office for Chinese Patent Application No. 02827708.2 (PCT/US2002/37184) received Aug. 14, 2008.

First Office Action from Chinese Patent Office for Chinese Patent Application No. 200610074754.7 dated May 8, 2009.

Office Action-non-final dated Jun. 12, 2009 for U.S Appl. No. 11/266,318.

First Office Action from Japanese Patent Office for Japanese Patent Application No. 2006-518675.

Office Action-restriction/election requirement dated Jul. 31, 2009 for U.S. Appl. No. 11/377,900.

Office Action Restriction/Election Requirement dated Sep. 30, 2009 for U.S. Appl. No. 11/374,386.

Letters Patent for Chinese Patent No. ZL200380109509.X issued on Sep. 9, 2009 (PCT/US2003/038743).

Second Office Action from Chinese Patent Office dated Sep. 4, 2009 for CN Patent Application Serial No. 200480025996.6 (PCT/US2004/020150).

Final Rejection from Japanese Patent Office dated Sep. 14, 2009 for Japanese Patent No. 2003-573718 (PCT/US02/37184).

Office Action-Non-final for U.S. Appl. No. 11/377,900 dated Dec. 8, 2009.

Office Action Final for U.S. Appl. No. 11/266,318 dated Feb. 1, 2010.

First Office Action from Chinese Patent Office for CN Pat. Appl. 2009-10164632.0 dated May 12, 2010.

Office Action with Restriction/Election Requirement for U.S. Appl. No. 11/811,649 dated Jun. 15, 2010.

Fourth Office Action from Chinese Patent Office for CN Appl. No. 200480025996.6 dated Sep. 6, 2010.

Final Office Action from Japanese Patent Office dated Mar. 19, 2010 for Japanese Patent Application No. 2003-573718.

Third Office Action from Chinese Patent Office dated Mar. 11, 2010 for Chinese Patent Application No. 200480025996.6.

Non-Final Office Action dated Apr. 1, 2010 for U.S. Appl. No. 11/374,386.

* cited by examiner

METHOD AND APPARATUS FOR ATTACHING NANOSTRUCTURE-CONTAINING MATERIAL ONTO A SHARP TIP OF AN OBJECT AND RELATED ARTICLES

RELATED APPLICATIONS

This application is a Divisional application of U.S. application Ser. No. 09/996,695, now U.S. Pat. No. 7,252,749, titled "Deposition Method for Nanostructure Materials", filed on Nov. 30, 2001, the entire contents of which are incorporated here by reference.

STATEMENT REGARDING FEDERALLY SPONSORED RESEARCH OR DEVELOPMENT

At least some aspects of this invention were made with Government support under the sponsorship of the Office of Naval Research, Contract No. N00014-98-1-05907. The Government may have certain rights in this invention.

BACKGROUND

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

The term "nanostructure" material is used by those familiar with the art to designate materials including nanoparticles such as $C_{60}$ fullerenes, fullerene-type concentric graphitic particles; nanowires/nanorods such as Si, Ge, $SiO_x$, $GeO_x$, or nanotubes composed of either single or multiple elements such as carbon, $B_xN_y$, $C_xB_yN_z$, $MoS_2$, and $WS_2$. One of the common features of nanostructure materials is their basic building blocks. A single nanoparticle or a carbon nanotube has a dimension that is less than 500 nm at least in one direction. These types of materials have been shown to exhibit certain properties that have raised interest in a variety of applications and processes.

U.S. Pat. No. 6,280,697 to Zhou et al. (entitled "Nanotube-Based High Energy Material and Method"), the disclosure of which is incorporated herein by reference, in its entirety, discloses the fabrication of carbon-based nanotube materials and their use as a battery electrode material.

U.S. Pat. No. 6,630,772 to Bower et al. (entitled "Device Comprising Carbon Nanotube Field Emitter Structure and Process for Forming Device") the disclosure of which is incorporated herein by reference, in its entirety, discloses a carbon nanotube-based electron emitter structure.

U.S. application Ser. No. 09/351,537, now abandoned, (entitled "Device Comprising Thin Film Carbon Nanotube Electron Field Emitter Structure"), the disclosure of which is incorporated herein by reference, in its entirety, discloses a carbon-nanotube field emitter structure having a high emitted current density.

U.S. Pat. No. 6,277,318 to Bower et al. (entitled "Method for Fabrication of Patterned Carbon Nanotube Films"), the disclosure of which is incorporated herein by reference, in its entirety, discloses a method of fabricating adherent, patterned carbon nanotube films onto a substrate.

U.S. Pat. No. 6,334,939 to Zhou et al. (entitled "Nanostructure-Based High Energy Capacity Material"), the disclosure of which is incorporated herein by reference, in its entirety, discloses a nanostructure alloy with alkali metal as one of the components. Such materials are described as being useful in certain battery applications.

U.S. Pat. No. 6,553,096 to Zhou et al. (entitled "X-Ray Generating Mechanism Using Electron Field Emission Cathode"), the disclosure of which is incorporated herein by reference, in its entirety, discloses an X-ray generating device incorporating a nanostructure-containing material.

U.S. Pat. No. 6,965,199 (entitled "Coated Electrode With Enhanced Electron Emission And Ignition Characteristics") the disclosure of which is incorporated herein by reference, in its entirety, discloses an electrode including a first electrode material, an adhesion-promoting layer, and a carbon nanotube-containing material disposed on at least a portion of the adhesion promoting layer, as well as associated devices incorporating such an electrode.

U.S. Pat. No. 6,787,122 (entitled "Method of Making Nanotube-Based Material With Enhanced Field Emission") the disclosure of which is incorporated herein by reference, in its entirety, discloses a technique for introducing a foreign species into the nanotube-based material in order to improve the emission properties thereof.

As evidenced by the above, nanostructure materials, such as carbon nanotubes possess promising properties, such as electron field emission characteristics which appear to be far superior to that of conventional field emitting materials. In particular, carbon-nanotube materials exhibit low emission threshold fields as well as large emission current densities. Such properties make them attractive for a variety of microelectronic applications, such as lighting elements, field emission flat panel displays, gas discharge tubes for over voltage protection, and x-ray generating devices.

However, the effective incorporation of such materials into these devices has been hindered by difficulties encountered in the processing of such materials. For instance, carbon nanotubes are produced by techniques such as laser ablation and arc discharge methods. Carbon nanotubes produced by such techniques are collected, subjected to further processes (e.g.—filtration and/or purification) and subsequently deposited or otherwise incorporated into the desired device. Thus, according to these conventional techniques, it is not possible to directly form carbon nanotubes onto a substrate or carrier material.

Post-formation methods such as screen printing and spraying have been utilized to deposit pre-formed carbon nanotubes on a substrate. However, such techniques pose certain drawbacks. For instance, screen printing requires the use of binder materials as well as an activation step. Spraying can be inefficient and is not practical for large-scale fabrication.

Carbon nanotubes have been grown directly upon substrates by use of chemical vapor deposition (CVD) techniques. However, such techniques require relatively high temperatures (e.g. ~600-1,000° C.) as well as reactive environments in order to effectively grow the nanotubes. The requirement for such harsh environmental conditions severely limits the types of substrate materials which can be utilized. In addition, the CVD technique often results in multi-wall carbon nanotubes. These multi-wall carbon nanotubes generally do not have the same level of structural perfection and thus have inferior electronic emission properties when compared with single-walled carbon nanotubes.

SUMMARY

Accordingly, methods and apparatus are described for attaching nanostructure-containing material onto a sharp tip of an object. According to an exemplary embodiment, a method includes forming a suspension of pre-formed nanostructure-containing material in a liquid medium. An electrode is immersed in the suspension. The sharp tip of the object is arranged to be in contact with the suspension. A voltage is applied to the immersed electrode and to the sharp tip, wherein the nanostructure-containing material attaches to the sharp tip of the object.

According to a related exemplary embodiment, an article of manufacture is described comprising a sharp tip having an individual nanotube, nanotube bundle, or nanowire attached thereto. The article is manufactured according to the above-described method, and can include a point electron field emission source, a probe of an atomic force microscope, a probe of a scanning tunneling microscope, an electron source of a transmission electron microscope, an electron source of a scanning electron microscope, a probe of a magnetic force microscope, or a profilometer.

According to another exemplary embodiment, a method includes forming a plurality of suspensions in respective liquid mediums, at least one of the suspensions including pre-formed nanostructure-containing material. At least one electrode is immersed in each of the suspensions. Sequentially for each of the plurality suspensions, the sharp tip of the object is arranged to be in contact with a respective suspension. A voltage is applied sequentially to the at least one electrode immersed in each respective suspension and to the sharp tip of the object. The nanostructure-containing material included in the at least one the suspensions attaches to the sharp tip of the object to form a respective nanostructure-containing layer of a composite multilayer structure.

According to a related exemplary embodiment, an article of manufacture is described comprising a sharp tip having an individual nanotube, nanotube bundle, or nanowire attached thereto. The article is manufactured according to the above-described method, and can include a point electron field emission source, a probe of an atomic force microscope, a probe of a scanning tunneling microscope, an electron source of a transmission electron microscope, an electron source of a scanning electron microscope, a probe of a magnetic force microscope, or a profilometer.

According to another exemplary embodiment, an apparatus is described for attaching nanostructure-containing material onto a sharp tip of an object. The apparatus includes an electrode configured to be immersed in a suspension of pre-formed nanostructure-containing material in a liquid medium. A voltage source is configured to apply a voltage to the electrode when immersed in the suspension and to the sharp tip of the object. The apparatus includes means for arranging the sharp tip of the object to be in contact with the suspension.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

A method performed consistent with the principles of the present invention, and according to a preferred embodiment, along with corresponding structures and devices, are described as follows.

Generally, a method performed according to the principles of the present invention can include a combination of some or all of the following steps: (1) forming a solution or suspension containing the nanostructure material; (2) selectively adding "chargers" to the solution; (3) immersing electrodes in the solution, the substrate upon which the nanostructure material is to be deposited acting as one of the electrodes; (4) applying a direct and/or alternating current thus creating an electrical field between the electrodes for a certain period of time thereby causing the nanostructure materials in the solution to migrate toward and attach themselves to the substrate electrode; and (5) optional subsequent processing of the coated substrate.

The process begins with pre-formed raw nanostructure or nanotube-containing material, such as a carbon nanotube-containing material. This raw nanotube material can comprise at least one of single-walled carbon nanotubes and multi-walled carbon nanotubes. According to a preferred embodiment, the raw carbon nanotube-containing material comprises single-walled carbon nanotubes.

The raw carbon-containing material can be fabricated according to a number of different techniques familiar to those in the art. For example, the raw carbon nanotube-containing material can be fabricated by laser ablation techniques (e.g. —see U.S. Pat. No. 6,280,697), chemical vapor deposition techniques (see, e.g. —C. Bower et al., "Plasma Induced Conformal Alignment of Carbon Nanotubes on Curvatured Surfaces," Appl. Phys. Lett. Vol. 77, No. 6, pgs. 830-32 (2000)), or arc-discharge techniques (see, e.g. —C. Journet et al., Nature, Vol. 388, p. 756 (1997)).

It is also contemplated by the present invention that raw materials be in the form of nanotube structures with a composition of $B_xC_yN_z$ (B=boron, C=carbon, and N=nitrogen), or nanotube or concentric fullerene structures with a composition $MS_2$ (M=tungsten, molybdenum, or vanadium oxide) can be utilized. These raw materials can be formed by any suitable technique, such as the above-mentioned arc-discharge technique.

It is also within the scope of the present invention that the raw materials are in the form of nanowires with at least one of the following: elemental metal, Si, Ge, oxide, carbide, nitride, chalcogenide. In addition, the raw materials can be in the form of nanoparticles of elemental metal, metal oxide, elemental and compound semi-conducting materials.

Next, the raw carbon nanotube-containing material is subjected to purification. A number of techniques for purifying the raw materials are envisioned. According to one preferred embodiment, the raw material can be purified by reflux in a suitable solvent, such as a combination of peroxide ($H_2O_2$) and water, with an $H_2O_2$ concentration of 1-40% by volume, preferably about 20% by volume $H_2O_2$, with subsequent rinsing in $CS_2$ and then in methanol, followed by filtration. According to an exemplary technique, approximately 10-100 ml of peroxide is introduced into the medium for every 1-10 mg of nanotubes in the medium, and the reflux reaction is carried out at a temperature of 20-100° C. (see, e.g. —U.S. Pat. No. 6,553,096).

According to another alternative, the raw carbon nanotube-containing material is placed in a suitable liquid medium, such as an acidic medium, an organic solvent, or an alcohol, preferably methanol. The nanotubes are kept in suspension within the liquid medium for several hours using a high-powered ultrasonic horn, while the suspension is passed through a microporous membrane. In another embodiment, the raw materials can be purified by oxidation in air or an oxygen environment at a temperature of 200-700° C. The impurities in the raw materials are oxidized at a faster rate than the nanotubes.

In yet another embodiment, the raw materials can be purified by liquid chromatography to separate the nanotubes/nanowires from the impurities.

The raw material is then optionally subjected to further processing to shorten the nanotubes and nanotube bundles, such as chemical etching.

According to one embodiment, the purified carbon nanotube material can be subjected to oxidation in a strong acid. For instance, purified carbon nanotube material can be placed in an appropriate container in a solution of acid comprising $H_2SO_4$ and $HNO_3$. The carbon nanotubes in solution are then subjected to sonication for an appropriate length of time. After sonication, the processed nanotubes are collected from the acid solution by either filtration or centrifuging after repeated dilution with de-ionized water.

Figure 1A:
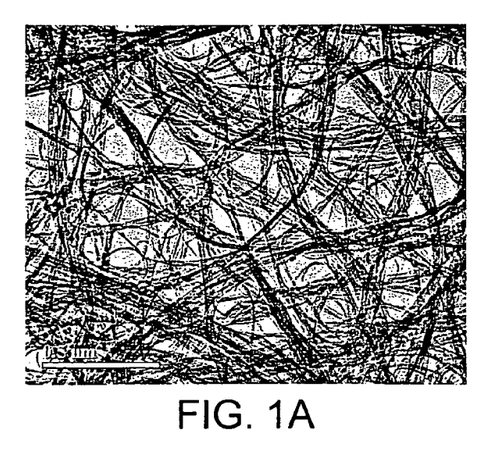
FIG. 1A is a transmission electron microscopic (TEM) image of purified single walled carbon nanotube bundles.
Figure 1B:
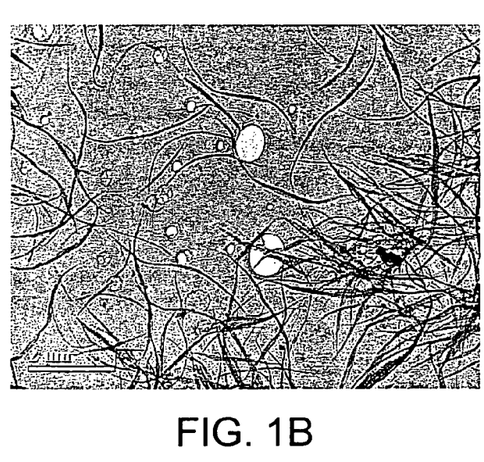
FIG. 1B is a TEM image of single walled carbon nanotubes etched to a 4 micron average bundle length.
Figure 1C:
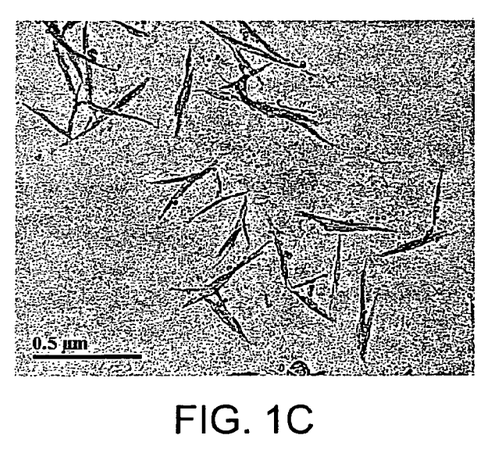
FIG. 1C is a TEM image of single walled carbon nanotubes etched to a 0.5 micron average bundle length.

An illustrative example of such a process is described as follows. Purified raw material formed as described above was found to contain approximately 90% single-walled nanotube bundles over 10 μm in length and 5-50 nm in bundle diameter. Such "long" nanotube bundles are illustrated by FIG. 1A. This material was chemically etched in a solution of $H_2SO_4$ and $HNO_3$ for 10-24 hours while being subjected to ultrasonic energy. After etching the single wall carbon nanotube bundles etched for 20 hours had an average length of 4 μm and the single wall carbon nanotube bundles etched for 24 hours had an average bundle length of 0.5 μm, as shown by the transmission electron microscopy images in FIGS. 1B-1C. Alternatively, the purified materials can be chemically functionalized by, for example, chemically or physically attaching chemical species to the outer surfaces of the carbon nanotubes such that they will be either soluble or form stable suspensions in certain solvents.

According to another alternative, the purified raw material can be shortened by mechanical milling. According to this technique, a sample of the purified carbon nanotube material is placed inside a suitable container, along with appropriate milling media. The container is then shut and placed within a suitable holder of a ball-milling machine. According to the present invention, the time that the sample is milled can vary. An appropriate amount of milling time can be readily determined by inspection of the milled nanotubes.

Regardless of the technique utilized, the preferred length of the shortened material, such as the above-mentioned nanotubes and nanotube bundles, is approximately 0.1-100 micrometers, preferably 0.1-10 micrometers, and more preferably 0.3-3.0 micrometers.

The purified raw material, regardless of whether subjected to the above-described shortening process, can also optionally be annealed at a suitable temperature, such as 100° C.-1200° C. According to a preferred embodiment, the annealing temperature is 100° C.-600° C. The material is annealed for a suitable time period, such as approximately 1 to 60 minutes. According to a preferred embodiment, the material is annealed for approximately 1 hour. The material is annealed in a vacuum of about $10^{-2}$ Torr, or at an even higher vacuum pressure. According to a preferred embodiment, the vacuum is about $5 \times 10^{-7}$ torr.

The above described "raw" or pre-formed material can now be introduced into a solution for deposition onto a substrate.

A suitable liquid medium is selected which will permit the formation of a stable suspension of the raw nanostructure material therein. According to a preferred embodiment the liquid medium comprises at least one of water, methanol, ethanol, alcohol, and dimethylformamide (DMF). According to a further preferred embodiment, the liquid medium comprises ethanol. Upon adding the raw material to the liquid medium, the mixture can optionally be subjected to ultrasonic energy or stirring using, for example, a magnetic stirrer bar, in order to facilitate the formation of a stable suspension. The amount of time that the ultrasonic energy is applied can vary, but it has been found that approximately two hours at room temperature is sufficient.

The concentration of raw material in the liquid medium can be varied, so long as a stable suspension is formed. For example, with a liquid medium comprising methanol, approximately 0.01 mg of the raw material, such as single-walled carbon nanotubes, can be present per ml of the liquid medium (0.01 mg/ml) and provide a stable suspension. When the liquid medium comprises DMF, approximately 0.4-0.5 mg of the raw material, such as single-walled carbon nanotubes, can be present per ml of the liquid medium (0.4-0.5 mg/ml) and provide a stable suspension. When shortened carbon nanotubes are used, stable suspension can be obtained at a higher concentration. For example, a stable dispersion of approximately 0.1 mg/ml of shortened nanotubes in water can be formed.

According to a preferred embodiment, a "charger" is added to the suspension in order to facilitate electrophoretic deposition. One such preferred charger is $MgCl_2$. Some other chargers include $Mg(NO_3)_2$, $La(NO_3)_3$, $Y(NO_3)_3$, $AlCl_3$, and sodium hydroxide. Any suitable amount can be utilized. Amounts ranging from less than 1% up to 50%, by weight, as measured relative top to the amount of nanostructure-containing material, are feasible. According to a preferred embodiment, the suspension can contain less than 1% of the charger.

A plurality of electrodes are then introduced into the suspension. According to a preferred embodiment, two electrodes are utilized. One of the electrodes comprises the substrate upon which the nanostructure material is to be deposited. Any suitable substrate material is envisioned, so long as it possesses the requisite degree of electrical conductivity. According to a preferred embodiment, the substrate is either metal or doped silicon.

An alternating current, or a direct current is applied to the electrodes thereby producing an electrical field between the electrodes. This causes the nanostructure material in the suspension to migrate toward and attach to the substrate electrode. According to one embodiment, the electrical field applied between electrodes is 0.1-1000 V/cm, and a direct current of 0.1-200 mA/cm$^2$ is applied for 1 second-1 hour.

Figure 2:
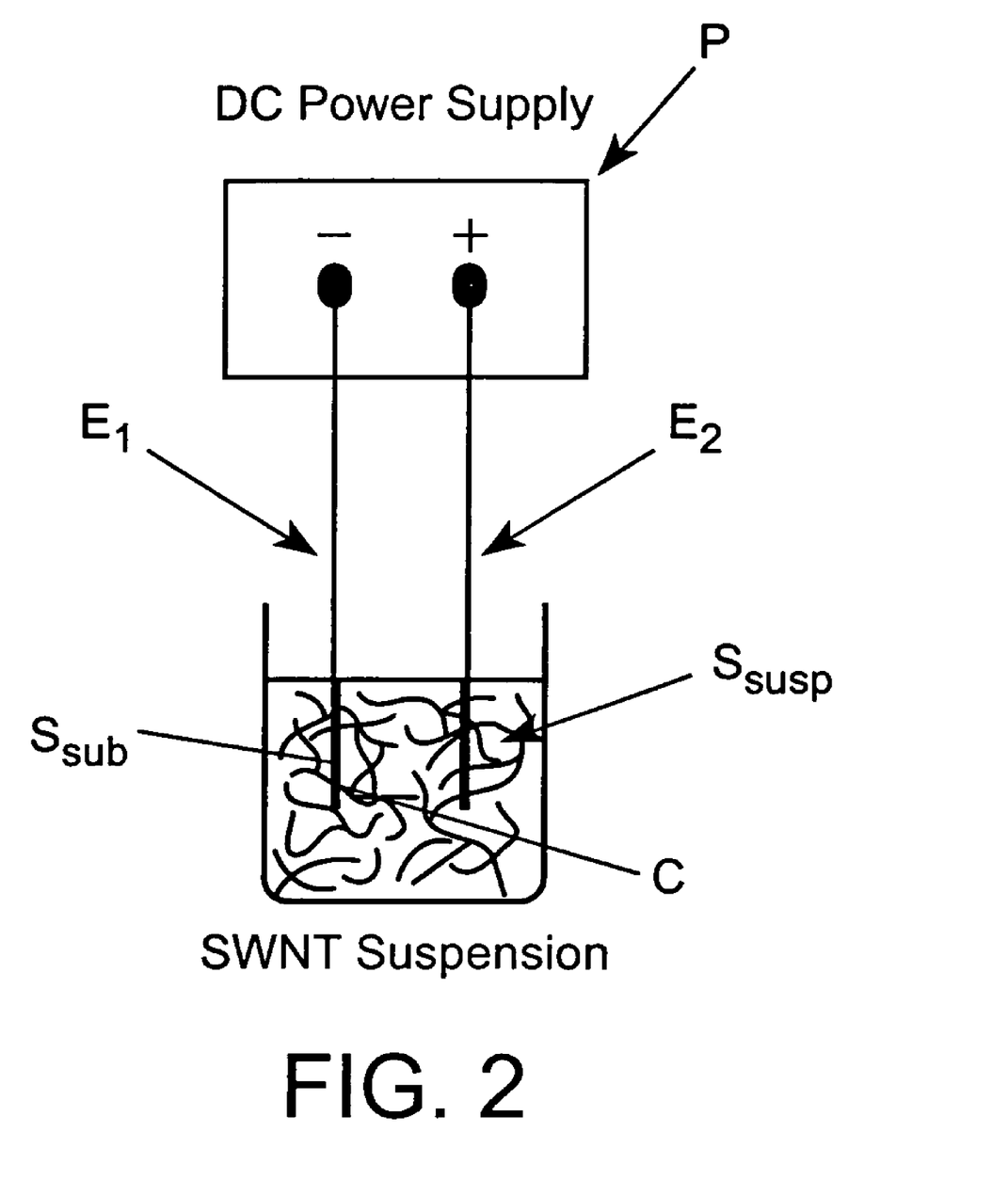
FIG. 2 is a schematic illustration of an electrophoretic deposition process according to the principles of the present invention.

FIG. 2 is a schematic illustration of the above-described process. As illustrated in FIG. 2, a pair of electrodes $E_1$ and $E_2$ are introduced into the suspension $S_{susp}$. The electrodes $E_1$ and $E_2$ are connected to a power supply P, which produces an electrical field between $E_1$ and $E_2$. Depending on the charge of the nanostructure material contained in the suspension $S_{susp}$, the nanostructure material will migrate toward and attach to one of the electrodes thereby forming a coating C of the nanostructure material on one of the electrodes. In the illustrative example, the substrate $S_{sub}$ is the negative electrode $E_1$, or anode.

According to a preferred embodiment, the above-described electrophoretic deposition is carried out at room temperature.

The rate of deposition of the coating C, as well as its structure and morphology can be influenced by many factors. Such factors include: the concentration of nanostructure material in the suspension $S_{susp}$, the concentration of the charger material (e.g. B MgCl$_2$) in the suspension $S_{susp}$, the conductivity of the substrate, and control of the power source P.

Figure 3A:
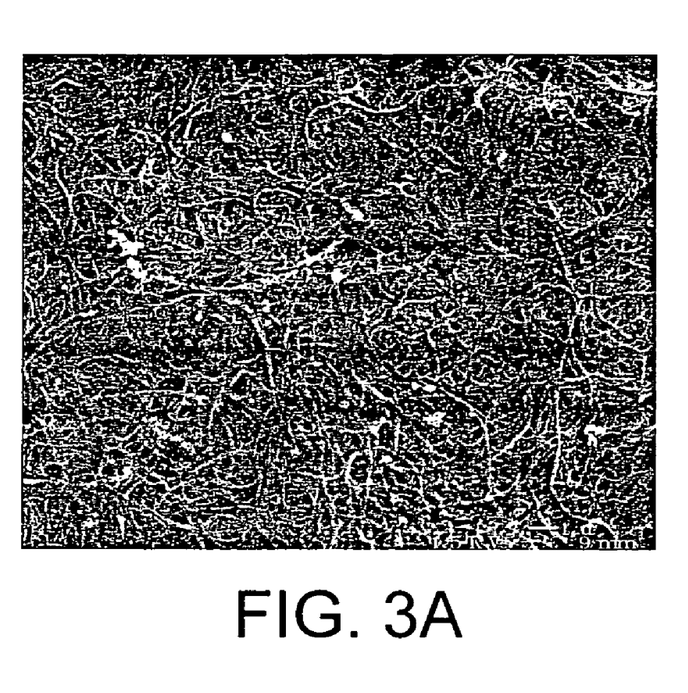
FIG. 3A is a scanning electron microscope (SEM) image of a coating of "long" single-walled carbon nanotubes onto a substrate according to the principles of the present invention.

By way of illustration, a stainless steel substrate/electrode and a counter electrode were introduced into a suspension comprising DMF and single-walled carbon nanotubes at a concentration of 0.4 mg/ml, and MgCl$_2$. A direct current was applied resulting in an electrical field of approximately 20 V/cm formed between the electrodes. Application of the current for about 30 seconds results in the formation of a smooth film of single-walled carbon nanotubes on the substrate. After application of direct current for approximately 10 minutes, a thin film of single-walled carbon nanotubes approximately 1 micrometer thick was deposited on the substrate. This film was examined using a scanning electron microscope, and is illustrated in FIG. 3A. The morphology of the deposited coating or film is similar to that of coating or film applied by spraying, and comprises clearly defined single-walled carbon nanotube bundles.

Figure 3B:
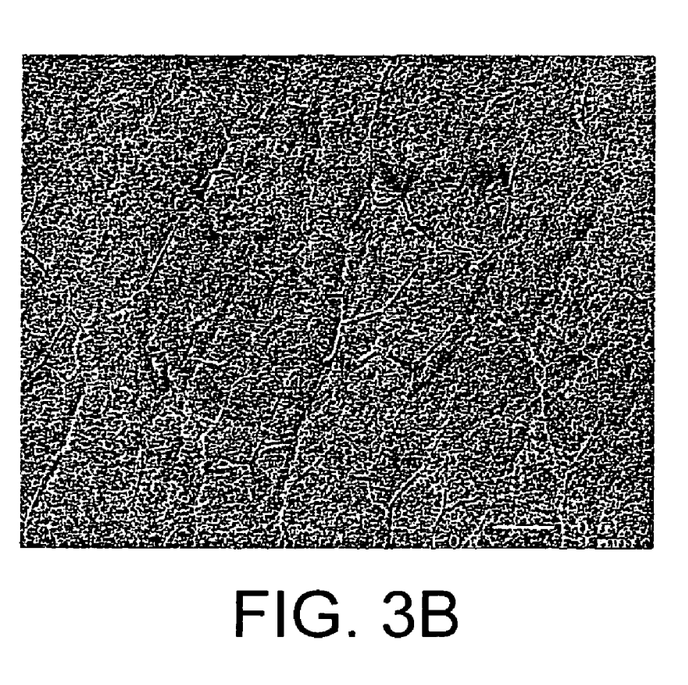
FIG. 3B is a SEM image of a coating of "short" single-walled carbon nanotubes onto a substrate according to the principles of the present invention.

FIG. 3B is a SEM image of a coating of single-walled carbon nanotube bundles deposited by electrophoretic deposition in the manner described above. However, the nanotubes were subjected to a previously described process to shorten their length (e.g. —to about a 0.5 μm average bundle length). The film depicted in FIG. 3 was densified by sintering in vacuum at a suitable temperature (e.g. –800° C.). This coating comprises distinct grain boundaries with densely packed grains. Individual single-walled carbon nanotube bundles are no longer discernable.

The particular electrode (i.e. —anode or the cathode) to which the nanostructure material migrates can be controlled through the selection of the charger material. For example, the use of a "negative" charger, such as sodium hydroxide (NaOH) imparts a negative charge to the nanostructure material, thereby creating a tendency for the nanostructure material to migrate towards the positive electrode (cathode). Conversely, when a "positive" charger material is used, such as MgCl$_2$, a positive charge is imparted to the nanostructure material, thereby creating a tendency for the nanostructure material to migrate toward the negative electrode (anode).

The electrodes are removed from the suspension after a suitable deposition period. The coated substrate electrode may optionally be subjected to further processing. For example, the coated substrate may be annealed to remove the liquid medium. Such an annealing procedure may be preferable, since removal of impurities such as residual suspension medium improves the emission characteristics of the nanostructure material. By way of example, the coated substrate can be heated to a temperature of approximately 100-1200° C. for approximately 1 hour, and then at approximately 800° C. for 2 hours, both at a vacuum of approximately 5×10$^{-7}$ Torr.

The emission characteristics of a film of single-walled carbon nanotubes (SWNT) formed according to the present invention has been evaluated and compared to that of SWNT materials prepared by other techniques. The results are summarized in following table.

In the following table, the measurements were made using a constant DC voltage. The threshold field is defined as the electrical field required for the emission current density to reach 0.01 mA/cm$^2$. The current decay is calculated by $(I_{initial}-I_{final})/I_{initial}$, where $I_{initial}$ is the initial emission current and $I_{final}$ is the emission current after 10 h of measurement.

| Materials | Threshold field [V/micrometer] | Initial emission current density [mA/cm$^2$] | Emission current decay after 10 hours [%] |
|---|---|---|---|
| As-grown SWNT material | 1.3 | 200 | 50 |
| Purified SWNT paper (made by filtration) | 1.0 | 93 | 40 |
| CVD SWNT film [a] | 3.1 | 10 | 79 |
| EPD long SWNT film | 1.4 | 83 | 3 |

Figure 4:
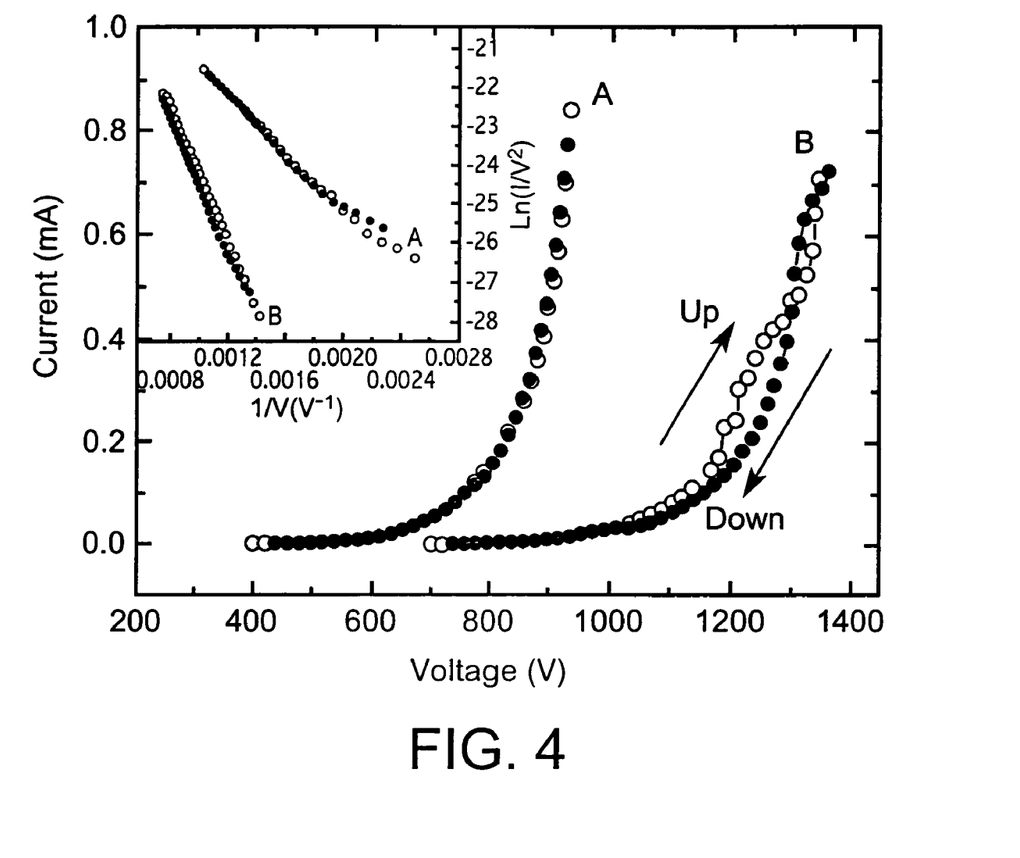
FIG. 4 is a plot of the measured electron field emission current versus the applied electrical field from a single-wall carbon nanotube films formed by the process of the present invention.

FIG. 4 is a plot of the total electron field emission current versus applied voltage for two samples of nanotube films A and B. Sample A was formed as previously described, using methanol as a suspension media. Sample B was formed using DMF as a suspension media. For both samples, the measurements were made over a 6 mm$^2$ emissions area at a cathode-anode distance of 160 μm at a base pressure of 2×10$^{-7}$ Torr. The inset portion of FIG. 4 represents the same data plotted as I/V$^2$ versus I/V, which shows a substantially linear behavior which is indicative of field emission of electrons.

According to the present invention, a film is formed having a threshold field for emission of less than 1.5 volts/micrometer. The film can produce an emission current density greater than 1 A/cm$^2$. The film can produce a total emission current greater than 10 mA over a 6 mm$^2$ area. The film can also produce a pulsed emission current having a pulse frequency higher than 10 KHz, preferably higher than 100 KHz. The total pulsed current measured over a 6 mm$^2$ area is preferably higher than 10 mA at 10-12 V/μm. Moreover, the emission current is capable of being consistently reproduced, without decay, even after a number of pulsed emissions, as evidenced by the above data. For instance, the pulsed current is stable and higher than 01 mA over a 6 mm² area for at least 1,000 pulses, preferably for at least 10,000 pulses.

As apparent from the above, the single-walled carbon nanotube film formed according to the principles of the present invention exhibit excellent field emission characteristics, especially in the area of resistance to emission current density decay.

The coating of nanostructure materials deposited according to the principles of the present invention exhibit better adhesion that a similar coatings applied by other techniques such as spraying. While not wishing to be limited by any particular theory, the improved adhesion may be due to the formation of metal hydroxide on the surface of the substrate (formed from metal ions of the electrode and OH groups from the charger). The films formed according to the principles of the present invention also exhibit improved field emission stability (i.e. —higher resistance to field emission decay).

According to a further embodiment, the adhesion of nanotubes to the substrate can be further improved by incorporation of adhesion promoting materials such as binders, carbon-dissolving or carbide-forming metal and high temperature annealing. These materials can be introduced by, for example, one of the following processes: co-deposition of the nanostructures and particles of adhesion promoting materials, sequential deposition, pre-deposition of a layer of adhesion promoting materials, etc.

In one embodiment, binders such as polymer binders are added to the suspension of the nanostructure-containing material which is then either stirred or sonicated to obtain a uniform suspension. Suitable polymer binders include poly (vinyl butyral-co vinyl alcohol-co-vinyl acetate) and poly (vinylidene fluoride). Suitable chargers are chosen such that under the applied electrical field, either DC or AC, the binder and the nanostructures would migrate to the same electrodes to form a coating with an intimate mixing of the nanostructures and the binder.

In another embodiment, small metal particles such as titanium, iron, lead, tin, cobalt are mixed into the suspension of the nanostructure-containing material. Suitable chargers are chosen such that under the applied electrical field, the metal particles and the nanostructures will migrate to the desired electrode to form a uniform coating with an intimate mixing of the metal particles and the nanostructures. After deposition, the coated substrate is annealed in vacuum with a base vacuum pressure of $10^{-3}$ Torr or greater for 0.1-10 hours. Preferably, the diameter of the particles is smaller than 1 micrometer.

The binders or adhesion promoting materials can be added in any suitable amount. Amounts ranging from 0.1-20% by weight, measured relative to the amount of nanostructure-containing material is envisioned.

In another embodiment, the substrate to be coated with the nanostructures is first coated with at least one layer of adhesion-promoting metal such as titanium, iron, lead, tin, cobalt, nickel, tantalum, tungsten, niobium, zirconium, vanadium, chromium or hafnium. The layer can be applied by techniques such as electrochemical plating, thermal evaporation, sputtering or pulsed laser deposition. After electrophoretic deposition of the nanostructures, the film is annealed in vacuum with a base vacuum pressure of $10^{-3}$ Torr or greater for 0.1-10 hours.

Thus, the above-described processes are advantageously well-adapted for high output and automation. These processes are very versatile and can be used to form uniform coatings of various thicknesses (e.g. —tens of nanometers to a few micrometers thick), coatings on complex shapes, as well as complicated structures such as composites and "gated" electrodes. The methods of the present invention are useful in producing nanotube materials which have properties that make them beneficial for use in a number of different applications. Generally, the method of the present invention is especially beneficial in providing nanotube material for incorporation into electron field emission cathodes for devices such as x-ray generating devices, gas discharge tubes, lighting devices, microwave power amplifiers, ion guns, electron beam lithography devices, high energy accelerators, free electron lasers, electron microscopes and microprobes, and flat panel displays.

The electrophoresis method of the present invention can used to coat substrates with composite layers in which nanostructured materials serve as one of the components. It can also be utilized to form multilayered structures on a supporting surface.

To deposit a composite layer containing nanostructure-containing material on a substrate, nanostructured materials and at least one more component (e.g. —polymer or metal particles) are suspended in a liquid medium to make up the electrophoresis bath. After selectively adding a "charger" to the suspension, two electrodes, wherein at least one of the electrodes comprises the substrate, are immersed in the suspension and a direct or alternating current is applied to the immersed electrodes thereby creating an electrical field between the electrodes. Because the nanostructured materials and the other component in the suspension are charged by the same "charger", they would migrate toward and attach to the same substrate simultaneously under the same electrical field. In the above described method, the composition of deposited composite layer is mostly decided by the composition of the suspension in which the electrophoresis has been carried out. Therefore, composite layers having different composition can be readily obtained by immersing a substrate in baths with deferent compositions and performing the above-described electrophoretic deposition.

While a composite layer can be made by electrophoresis using only one bath, multiple baths can be used to produce a multilayered electrophoretic deposition. The electrophoresis is carried out in each bath sequentially with each bath producing a layer of different composition in the multilayered structure. When the desired thickness of a layer is reached, the deposition electrode can be moved to the next suspension for deposition of the next layer.

The electrophoretic deposition technique disclosed can be further applied to deposit an individual or a bundle of carbon nanotubes or nanowires selectively onto a sharp tip. This sharp tip can be, for example, the tip used for microscopes including atomic force microscopes, scanning tunneling microscopes, or profilometers.

Figure 5A:
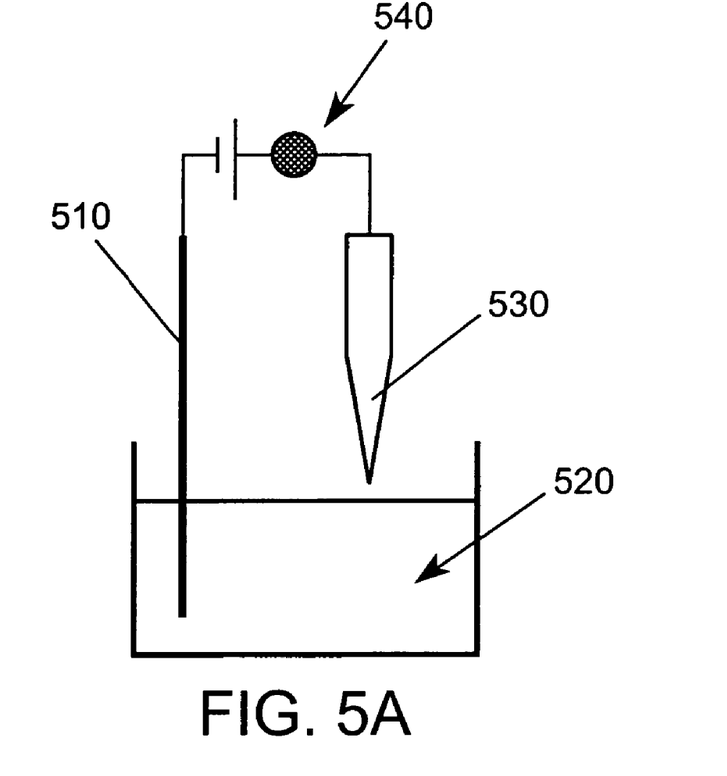
FIG. 5A is a schematic illustration of a process according to the present invention used to attach a bundle or a single carbon nanotube or a nanowire to an object with a sharp tip.
Figure 5B:
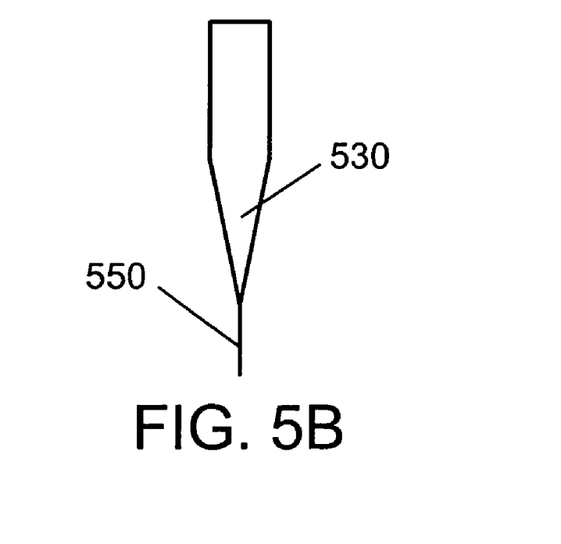
FIG. 5B is a schematic illustration of the sharp tip having an attached single carbon nanotube or nanowire formed according to a process as depicted in FIG. 5A.

One such embodiment is illustrated in FIGS. 5A-5B, where a dilute suspension of nanotube or nanowire is first prepared. A counter electrode 510 can be immersed into the suspension 520. The metal tip 530 can be used as a second electrode for applying a voltage between the metal tip 530 and the counter electrode 510 using a voltage source, such as the power supplies shown in FIGS. 2 and 5. A portion of the sharp tip 530 where the nanotube/nanowire is to be deposited can first be placed perpendicular to and slightly above the top surface of the suspension 520 as shown in FIG. 5A. For example, means for arranging the sharp tip 530 of the object to be in contact with the suspension 520 can include a movable stage (not shown). The object having the sharp tip can be removably attached the to the stage. The tip 530 can then be gradually moved toward the surface of the suspension 520 to bring the tip into contact with the suspension. For example, the means for arranging, such as the movable stage, can include means for placing the sharp tip 530 of the object directly above the surface of the suspension 520 and means for moving the sharp tip 530 toward the surface of the suspension 520 until electrical contact is established between the immersed electrode and the sharp tip. In an alternative embodiment, both the electrode 510 and the sharp tip 530 of the object can be immersed in the suspension 520 prior to applying the voltage, as shown in FIG. 2.

A meter such as a current meter 540 can be used to monitor the electrical current between the counter electrode 510 and the metal tip 530 to determine when electrical contact is established via the suspension 520. In addition to or alternatively, an appropriate optical magnification device can be used to monitor the gap between the metal tip 530 and the suspension surface 520. When the tip touches the surface of the suspension, the electrical current passing between the two electrodes is detected by the meter 540. Depending on the concentration of the nanostructures in the suspension and the electrical field used, the tip 530 is allowed to stay in contact with for a pre-determined time. The voltage applied between the two electrodes is then turned off and the tip 530 is raised to be above the suspension to stop the deposition process. Alternatively, the voltage applied to the immersed electrode and the sharp tip can be disconnected while the tip remains in contact with the suspension after expiration of the predetermined amount of time. The means for arranging, such as the movable stage, can include means for raising the tip 530 above the surface of the suspension 520 after the predetermined amount of time expires.

Figure 5C:
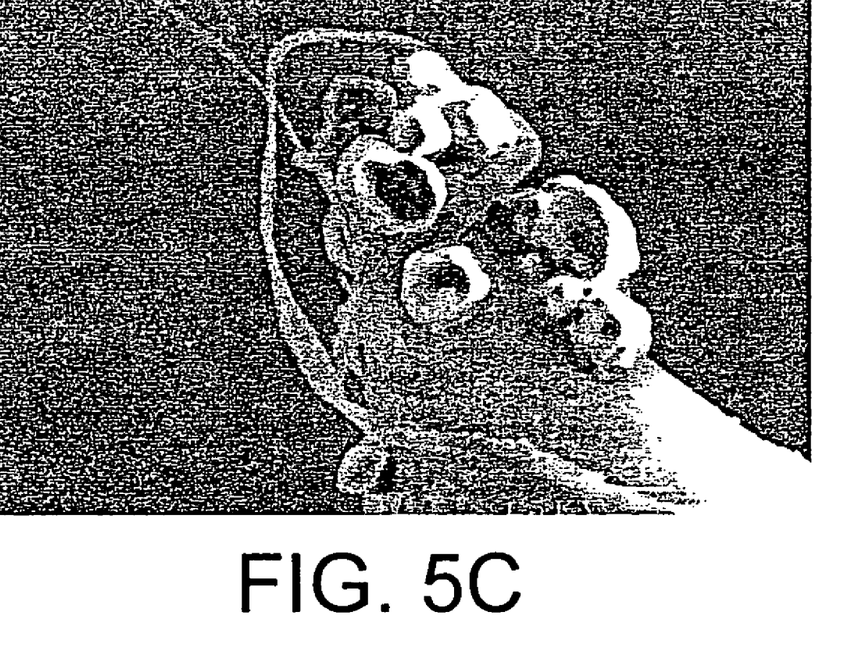
FIG. 5C is an SEM image the sharp tip having an attached single carbon nanotube or nanowire formed according to a process of the present invention.

According to an exemplary embodiment, the metal tip 530 with a carbon nanotube 550 or other nanostructure attached thereto can be vacuum annealed to increase the bonding between the tip and the nanostructure. FIG. 5C is an SEM image of a sharp tip having a single nanotube or nanowire deposited thereon according to the techniques of the present invention.

In addition, a composite multilayered structure can be formed on the sharp tip 530 by carrying out the deposition in a number of electrophoresis baths as described above. For example, a plurality of suspensions can be formed in respective liquid mediums. At least one of the suspensions can include pre-formed nanostructure-containing material. Then, sequentially for each of the plurality suspensions, the sharp tip 530 of the object can be arranged to be in contact with a respective suspension 520, and a voltage applied to the at least one electrode 510 immersed in the respective suspension 520 and to the sharp tip 530 of the object. The nanostructure-containing material included the at least one of the suspensions can be attached to the sharp tip 530 of the object to form a respective nanostructure-containing layer of a composite multilayer structure.

Another application of the process of the present invention is fabrication of triode-type structures with nanostructured field emission materials deposited in selected areas. Such structures can be used, for example, in field emission flat panel displays; cold cathodes for x-ray tubes, microwave amplifiers, etc.

Figure 6A:
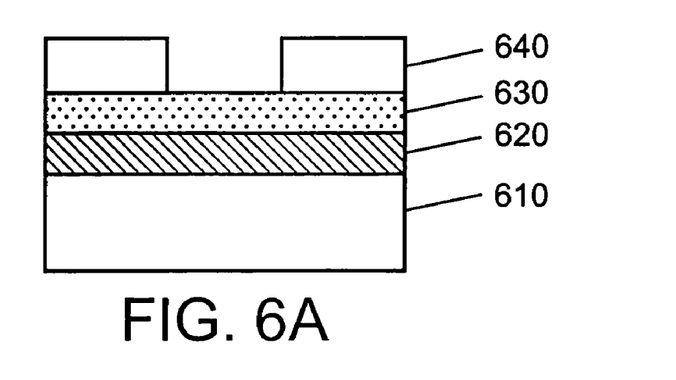
FIG. 6A-6C are a schematic illustrations of a selective deposition process performed according to the present invention.

In one embodiment of this application is illustrated in FIGS. 6A-7B, where a multilayer structure comprising a Si substrate 610, a dielectric insulating layer 620 such as silicon dioxide, a conducting layer 630 and a layer of photoresist 640 is fabricated by common thin film fabrication techniques (FIG. 6A). A photo-mask is used to selectively expose the photoresist 640 to ultraviolet light. The multilayer structure is then developed using suitable chemicals to remove the exposed underlying multi-layer structure at the desired locations (FIG. 6B). As illustrated in FIG. 6B, the dimension D of the exposed areas of substrate 610 is small. For example, D can be on the order of 1-100 micrometers, preferably 5-20 micrometers. The exposed areas can be in the form of an array of rounded holes or polygons such as squares. As illustrated in FIG. 6C, carbon nanotubes or other nanostructures are selectively deposited on the exposed Si surfaces of substrate 610 by electrophoresis. In one embodiment, the chemical etched structure is immersed into a carbon nanotube suspension. Contact to the power source is made on the back of surface 610. A metal plate is used as the counter electrode. A bias voltage is also preferably applied to the conductive surface 630 to prevent deposition of carbon nanotubes on the metal surface. Under the applied electrical field, carbon nanotubes will migrate to the exposed surfaces of substrate 610.

Figure 6B:
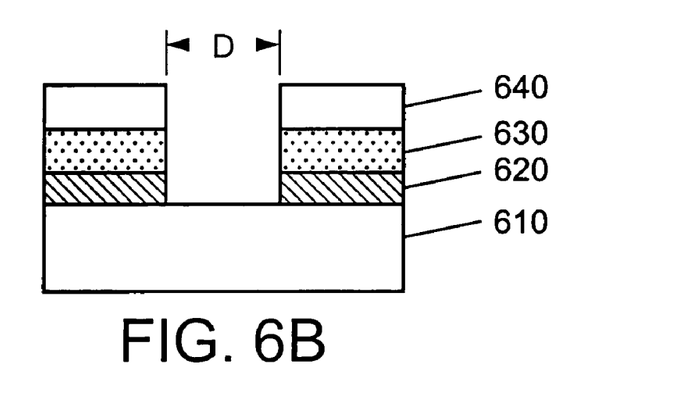
Figure 6C:
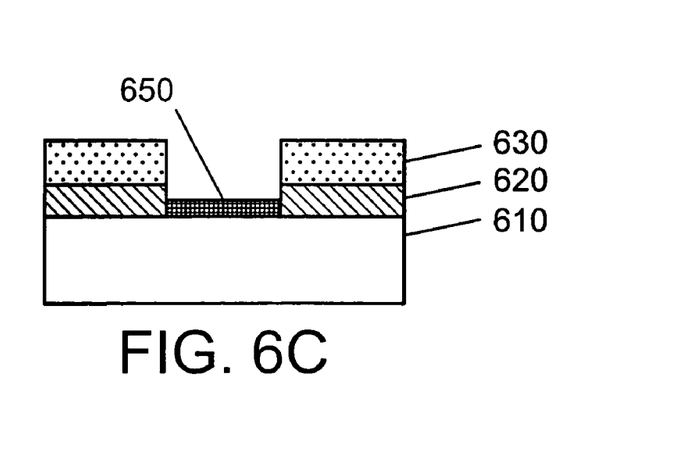

For purposes of illustration, the dielectric layer 620 can have a thickness on the order of 1-100 micrometers, preferably 1-10 micrometers.

Figure 7A:
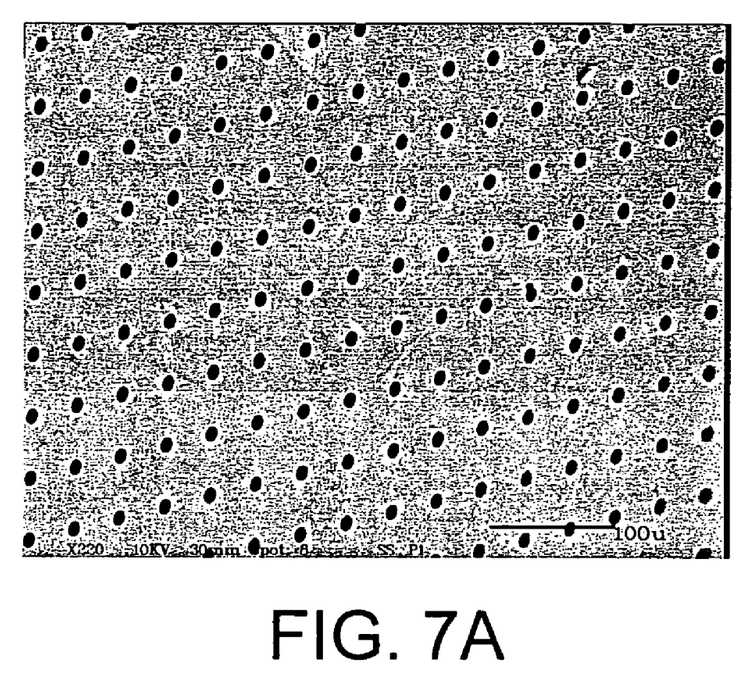
FIGS. 7A and 7B are SEM images showing a top view of a coated surface of a multilayer structure formed according to a selective deposition process as illustrated in FIGS. 6A-6C.
Figure 7B:
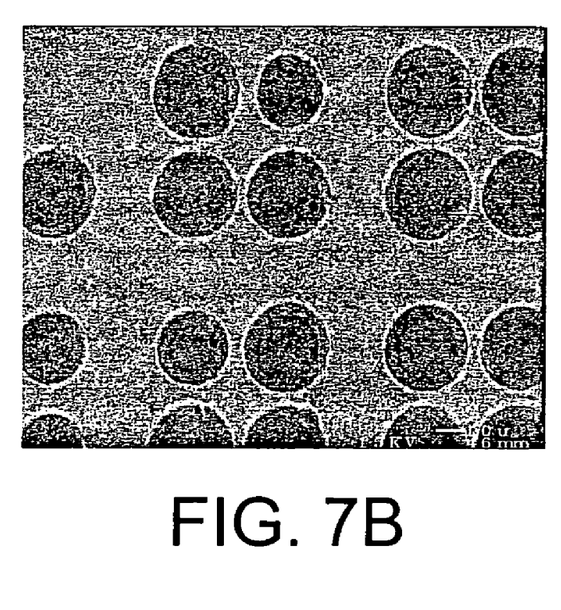

FIGS. 7A and 7B show the top view of the etched multi-layer structures formed as described above.

In addition, the electrophoresis method of the present invention can also be utilized to form a patterned deposit of nanostructure-containing material onto a substrate.

FIGS. 8A to 8D illustrate one embodiment of this application. According to the illustrated embodiment, a mask 640 is placed on top of a first surface of a substrate 650 before electrophoresis. The area 670 on the surface of substrate 650 where no deposition is intended is blocked by the mask 640, while the areas 660 on the surface of substrate 650 are exposed to the electrophoresis bath through corresponding openings in the mask 640.

The masked substrate is then introduced into a suspension and coated by electrophoresis in a manner consistent with the present invention, as set forth in detail above.

Figure 8A:
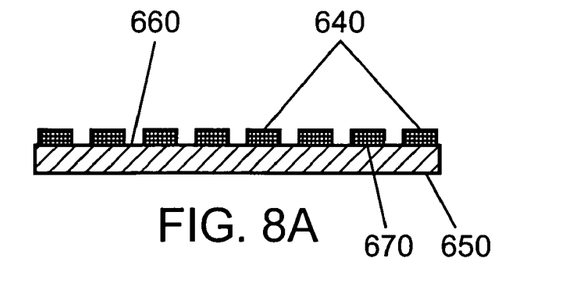
FIGS. 8A-8C are schematic illustrations of an embodiment of a selective deposition process according to the present invention.
Figure 8B:
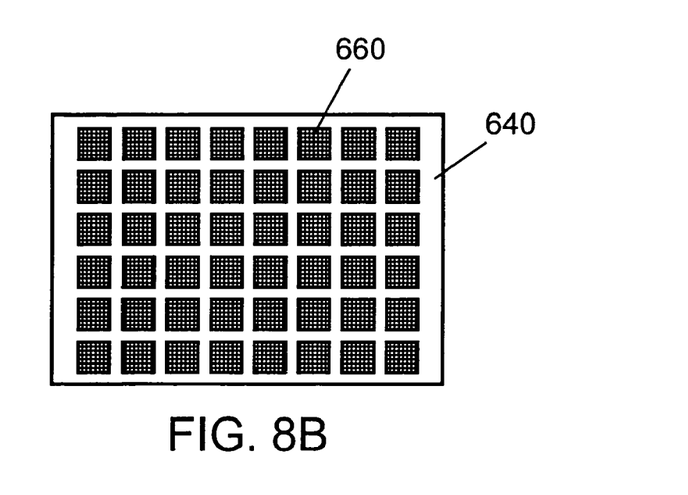
Figure 8C:
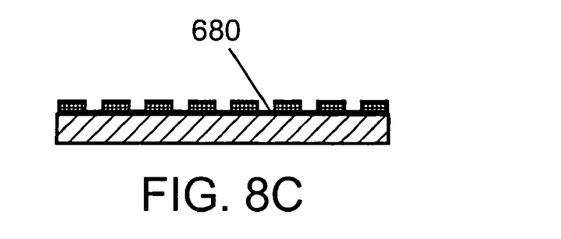
Figure 8D:
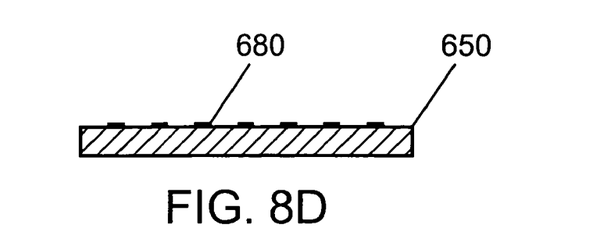
FIG. 8D is a side view of an embodiment of a patterned substrate formed according to the process of FIGS. 8A-8C.

After deposition, the mask 640 is removed from the substrate 650 and a clean patterned structures 680 containing nanostructure-containing material is obtained, as illustrated in FIG. 8D. The dimension(s) and shape(s) of the patterned structures are defined by the openings of the mask 640.

FIGS. 8A and 8B show the side and the top view of the mask-blocked substrate before electrophoresis. FIG. 8C shows the side view of the mask-blocked substrate after electrophoresis. FIG. 8D is the side view of the final structures on the substrate.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method of attaching carbon nanotubes and/or nanowires onto a sharp tip by an electrophoresis process, the method comprising the successive steps of:
   providing an object with a sharp, pointed tip;
   forming a suspension containing at least one of a carbon nanotube or nanowire, wherein the suspension has a surface;
   immersing an electrode in the suspension;
   placing the sharp tip of the object perpendicular to and directly above the surface of the suspension;
   applying a voltage between the immersed electrode and the sharp tip;

moving the sharp tip toward the surface of the suspension until electrical contact is established between the immersed electrode and the sharp tip;

allowing current to pass between the immersed electrode and the sharp tip for a predetermined amount of time, wherein the carbon nanotube or nanowire attaches to the sharp tip and remains permanently attached after the application of voltage is discontinued; and raising the sharp tip above the surface of the suspension after expiration of the predetermined amount of time.

2. The method of claim 1, comprising:

monitoring the current between the immersed electrode and the sharp tip to determine when electrical contact between the electrode and tip is established.

3. The method of claim 1, further comprising:

annealing the sharp tip with attached nanotube or nanowire.

4. The method of claim 1, wherein forming a suspension containing carbon nanotubes or nanowires further comprises selectively adding a charger to the liquid medium.

5. The method of claim 1, wherein the nanotubes comprise at least one of carbon, BxNy, CxByNz, and MS2, wherein M=tungsten, molybdenum, or vanadium oxide.

6. The method of claim 1, wherein the nanowires comprise at least one of an elemental metal, an elemental or a compound semiconductor, an oxide, a carbide, a nitride, and a chalcogenide.

7. The method of claim 1, comprising attaching an individual nanotube, nanotube bundle, or nanowire to the sharp tip at a contact point of the sharp tip with the suspension.

8. The method of claim 1, wherein the object with a sharp tip comprises a plurality of sharp tips, wherein the plurality of sharp tips are arranged to concurrently be in contact with the suspension, whereby the nanostructure-containing material attaches to each of the sharp tips.

9. The method of claim 1, wherein the electrophoresis process is a dielectrophoresis method where an alternating-current voltage is applied between the sharp tip and the immersed electrode.

10. The method of claim 1, wherein either an individual nanotube or a single nanowire is attached to the sharp tip after the electrophoresis process.

11. The method of claim 1, wherein multiple nanotubes, multiple nanowires, or a mixture of nanotubes and nanowires are attached to the sharp tip after the electrophoresis process.

12. The method of claim 1, wherein the sharp tip with the attached nanotube or nanowire used as a probe for an atomic force microscope, a probe for a scanning tunneling microscope, or a point electron field emission source.

13. The method of claim 1, wherein allowing current to pass between the immersed electrode and the sharp tip for a predetermined amount of time comprises the carbon nanotube or nanowire forming a protrusion or bundle on the sharp tip wherein the carbon nanotube or nanowire remains permanently attached even after application of voltage is discontinued.

* * * * *